US012676688B2

(12) United States Patent
Wang et al.

(10) Patent No.: US 12,676,688 B2
(45) Date of Patent: Jul. 7, 2026

(54) TRANSMISSION MODE ADAPTATION IN NEW RADIO WITH AI/ML ASSISTANCE

(71) Applicant: Samsung Electronics Co., Ltd., Suwon-si (KR)

(72) Inventors: Tiexing Wang, Plano, TX (US); R A Nadisanka Perera Rupasinghe, Allen, TX (US); Daoud Burghal, San Jose, CA (US); Yang Li, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 327 days.

(21) Appl. No.: 18/363,670

(22) Filed: Aug. 1, 2023

(65) Prior Publication Data

US 2024/0063931 A1     Feb. 22, 2024

Related U.S. Application Data

(60) Provisional application No. 63/458,009, filed on Apr. 7, 2023, provisional application No. 63/398,135, filed on Aug. 15, 2022.

(51) Int. Cl.
| | |
|---|---|
| *H04B 17/391* | (2015.01) |
| *H04B 7/0417* | (2017.01) |
| *H04B 7/06* | (2006.01) |

(52) U.S. Cl.
CPC ....... *H04B 17/3913* (2015.01); *H04B 7/0417* (2013.01); *H04B 7/0626* (2013.01)

(58) Field of Classification Search
CPC .................... H04B 17/3913; H04B 7/0417; H04B 7/0626; H04B 7/0413; H04B 7/0456; H04B 7/061; H04B 7/0689
See application file for complete search history.

(56) References Cited

U.S. PATENT DOCUMENTS

| | | | |
|---|---|---|---|
| 9,154,198 B2 | 10/2015 | El-Najjar et al. | |
| 9,948,376 B1 | 4/2018 | Pawar et al. | |
| | | (Continued) | |

FOREIGN PATENT DOCUMENTS

WO     2022105888 A1     5/2022

OTHER PUBLICATIONS

International Search Report and Written Opinion issued Nov. 8, 2023 regarding International Application No. PCT/KR2023/011832, 8 pages.

(Continued)

*Primary Examiner* — Tejis Daya

(57) ABSTRACT

Apparatuses and methods for transmission mode adaptation in New Radio (NR) with AI/ML assistance. A base station includes a transceiver configured to receive a set of input metrics. The set of input metrics comprises at least one metric derived from a channel state information (CSI) report. The base station further includes a processor operably coupled to the transceiver, the processor configured to determine, based on the set of input metrics, a first multiple-input multiple-output (MIMO) mode throughput prediction and a second MIMO mode throughput prediction, generate, based on the first MIMO mode throughput prediction, a predicted first MIMO mode throughput result, generate, based on the second MIMO mode throughput prediction, a predicted second MIMO mode throughput result, and select a MIMO mode based on the predicted first MIMO mode throughput result and the predicted second MIMO mode throughput result.

20 Claims, 6 Drawing Sheets

(56)         References Cited

U.S. PATENT DOCUMENTS

| | | | |
|---|---|---|---|
| 10,333,664 | B1 * | 6/2019 | Pawar .................... H04L 5/0037 |
| 11,159,957 | B2 | 10/2021 | Morita et al. |
| 11,271,624 | B2 | 3/2022 | Jana et al. |
| 2008/0232502 | A1 | 9/2008 | Wild et al. |
| 2013/0287132 | A1 | 10/2013 | Taoka et al. |
| 2014/0241471 | A1 | 8/2014 | Orlik et al. |
| 2014/0348017 | A1 | 11/2014 | Zhu |
| 2015/0249490 | A1 | 9/2015 | Chen et al. |
| 2016/0269093 | A1 | 9/2016 | Seol et al. |
| 2017/0041053 | A1 | 2/2017 | Murakami et al. |
| 2018/0302889 | A1 | 10/2018 | Guo et al. |
| 2020/0186227 | A1 * | 6/2020 | Reider ................. H04B 7/0626 |
| 2020/0259545 | A1 | 8/2020 | Bai et al. |
| 2021/0021307 | A1 * | 1/2021 | Shattil ................. H04W 72/046 |
| 2023/0308143 | A1 | 9/2023 | Yuan et al. |
| 2024/0056144 | A1 * | 2/2024 | Rupasinghe ......... H04B 17/373 |
| 2024/0162955 | A1 * | 5/2024 | Whinnett .............. H04W 24/10 |
| 2025/0373286 | A1 * | 12/2025 | Wang ................... H04B 7/0413 |

OTHER PUBLICATIONS

Jiang et al., "Neural Network-Based Fading Channel Prediction: A Comprehensive Overview", IEEE Access, vol. 7, Aug. 2019, pp. 118112-118124.

Extended European Search Report issued Jun. 16, 2025 regarding Application No. 23855102.2, 11 pages.

* cited by examiner

TRANSMISSION MODE ADAPTATION IN NEW RADIO WITH AI/ML ASSISTANCE

CROSS-REFERENCE TO RELATED APPLICATION(S) AND CLAIM OF PRIORITY

This application claims priority under 35 U.S.C. § 119(e) to U.S. Provisional Patent Application No. 63/398,135 filed on Aug. 15, 2022 and U.S. Provisional Patent Application No. 63/458,009 filed on Apr. 7, 2023. The above-identified provisional patent applications are hereby incorporated by reference in their entirety.

TECHNICAL FIELD

This disclosure relates generally to wireless networks. More specifically, this disclosure relates to transmission mode adaption in new radio (NR) with artificial intelligence (AI)/machine learning (ML) assistance.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides apparatuses and methods for transmission mode adaptation in New Radio with AI/ML assistance.

In one embodiment, a base station (BS) is provided. The BS includes a transceiver configured to receive a set of input metrics. The set of input metrics comprises at least one metric derived from a channel state information (CSI) report. The BS further includes a processor operably coupled to the transceiver. The processor is configured to, determine, based on the set of input metrics, a first multiple-input multiple-output (MIMO) mode throughput prediction and a second MIMO mode throughput prediction, generate, based on the first MIMO mode throughput prediction, a predicted first MIMO mode throughput result, generate, based on the second MIMO mode throughput prediction, a predicted second MIMO mode throughput result, and select a MIMO mode based on the predicted first MIMO mode throughput result and the predicted second MIMO mode throughput result.

In another embodiment, a method of operating a BS is provided. The method includes receiving a set of input metrics. The set of input metrics comprises at least one metric derived from a CSI report. The method further includes determining, based on the set of input metrics, a first MIMO mode throughput prediction and a second MIMO mode throughput prediction, generating, based on the first MIMO mode throughput prediction, a predicted first MIMO mode throughput result, generating, based on the second MIMO mode throughput prediction, a predicted second MIMO mode throughput result, and selecting a MIMO mode based on the predicted first MIMO mode throughput result and the predicted second MIMO mode throughput result.

In yet another embodiment, a non-transitory computer readable medium embodying a computer program is provided. The computer program comprises program code that, when executed by a processor of a device, causes the device to receive a set of input metrics. The set of input metrics comprises at least one metric derived from a CSI report. The computer program further comprises program code that, when executed by a processor of a device, causes the device to determine, based on the set of input metrics, a first MIMO mode throughput prediction and a second MIMO mode throughput prediction, generate, based on the first MIMO mode throughput prediction, a predicted first MIMO mode throughput result, generate, based on the second MIMO mode throughput prediction, a predicted second MIMO mode throughput result, and select a MIMO mode based on the predicted first MIMO mode throughput result and the predicted second MIMO mode throughput result.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
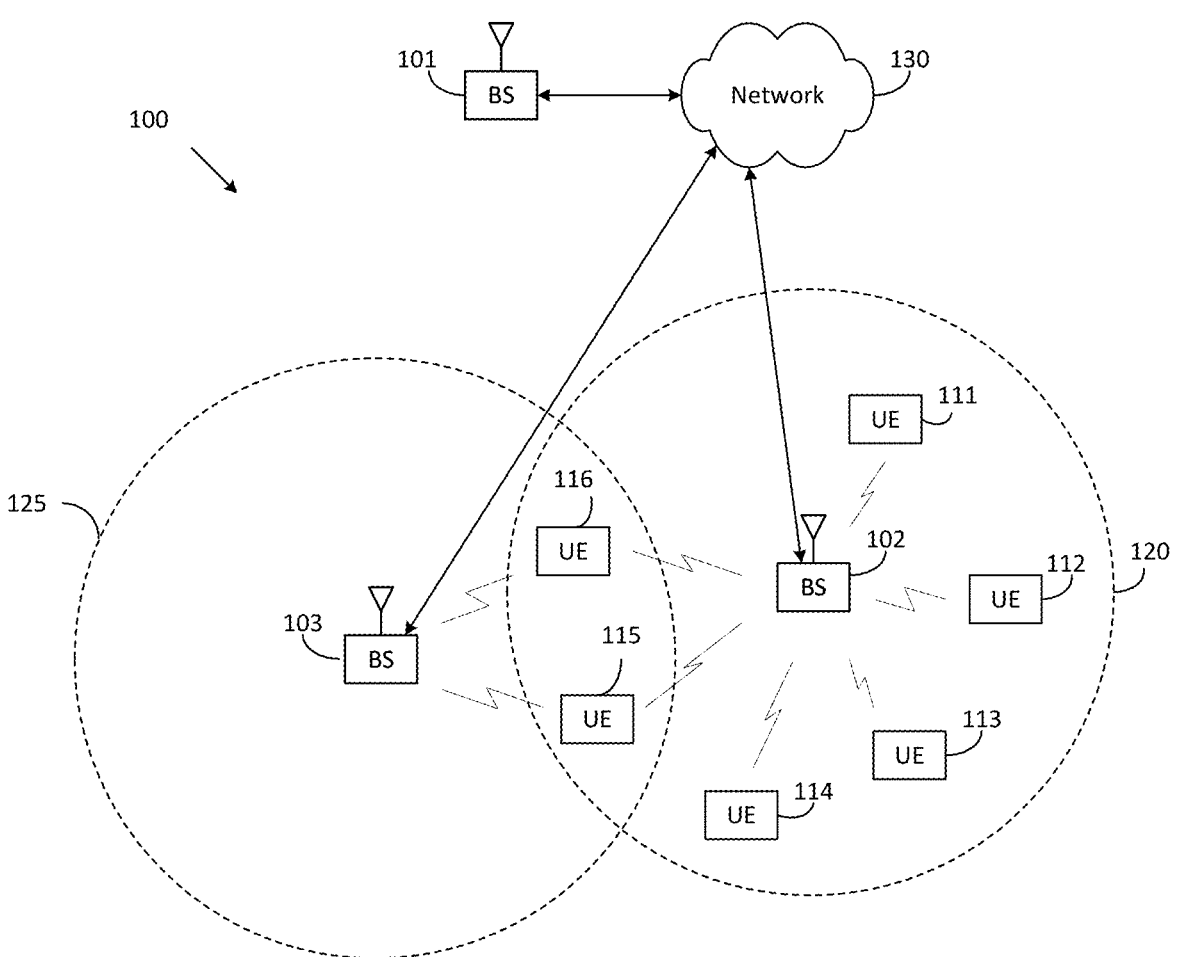
FIG. 1 illustrates an example wireless network according to embodiments of the present disclosure.
Figure 2:
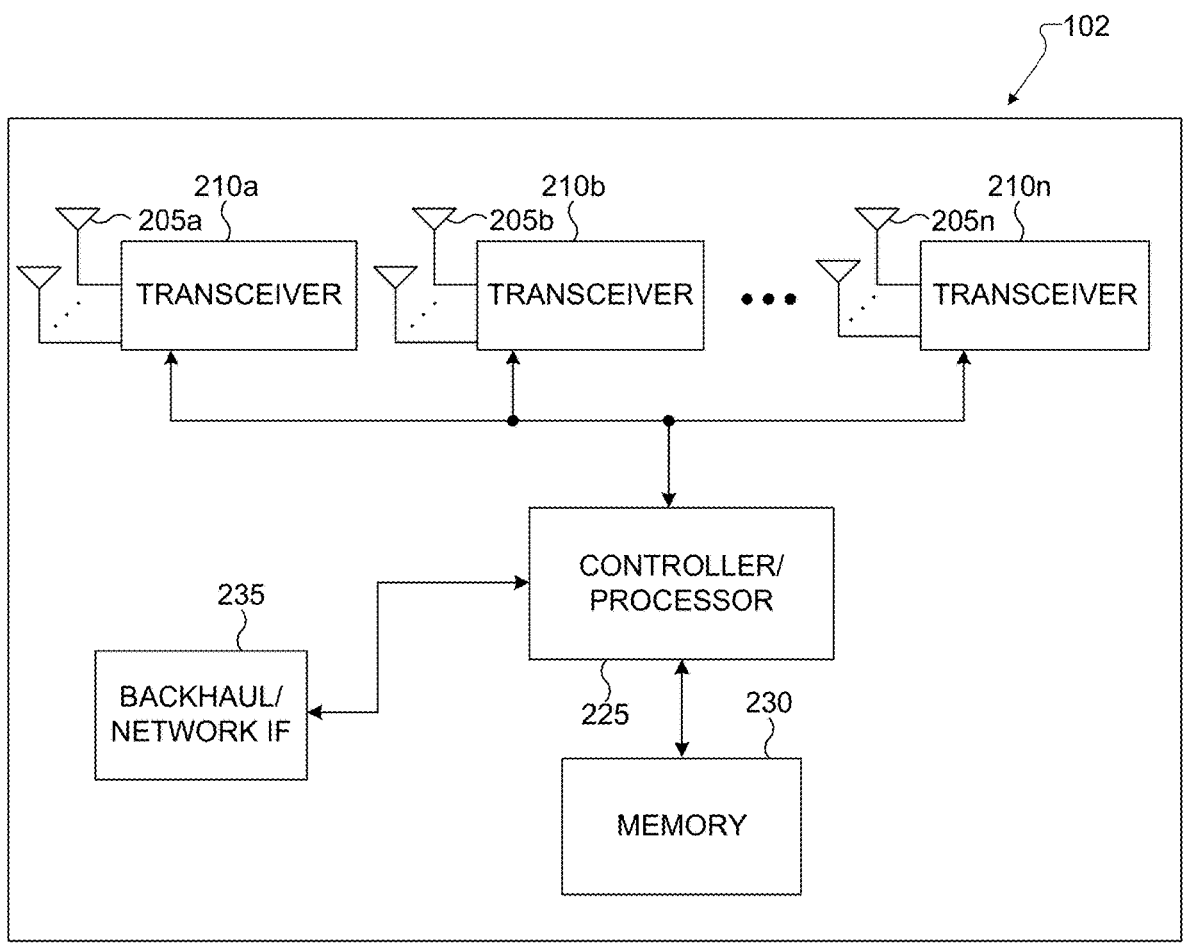
FIG. 2 illustrates an example gNB according to embodiments of the present disclosure.
Figure 3:
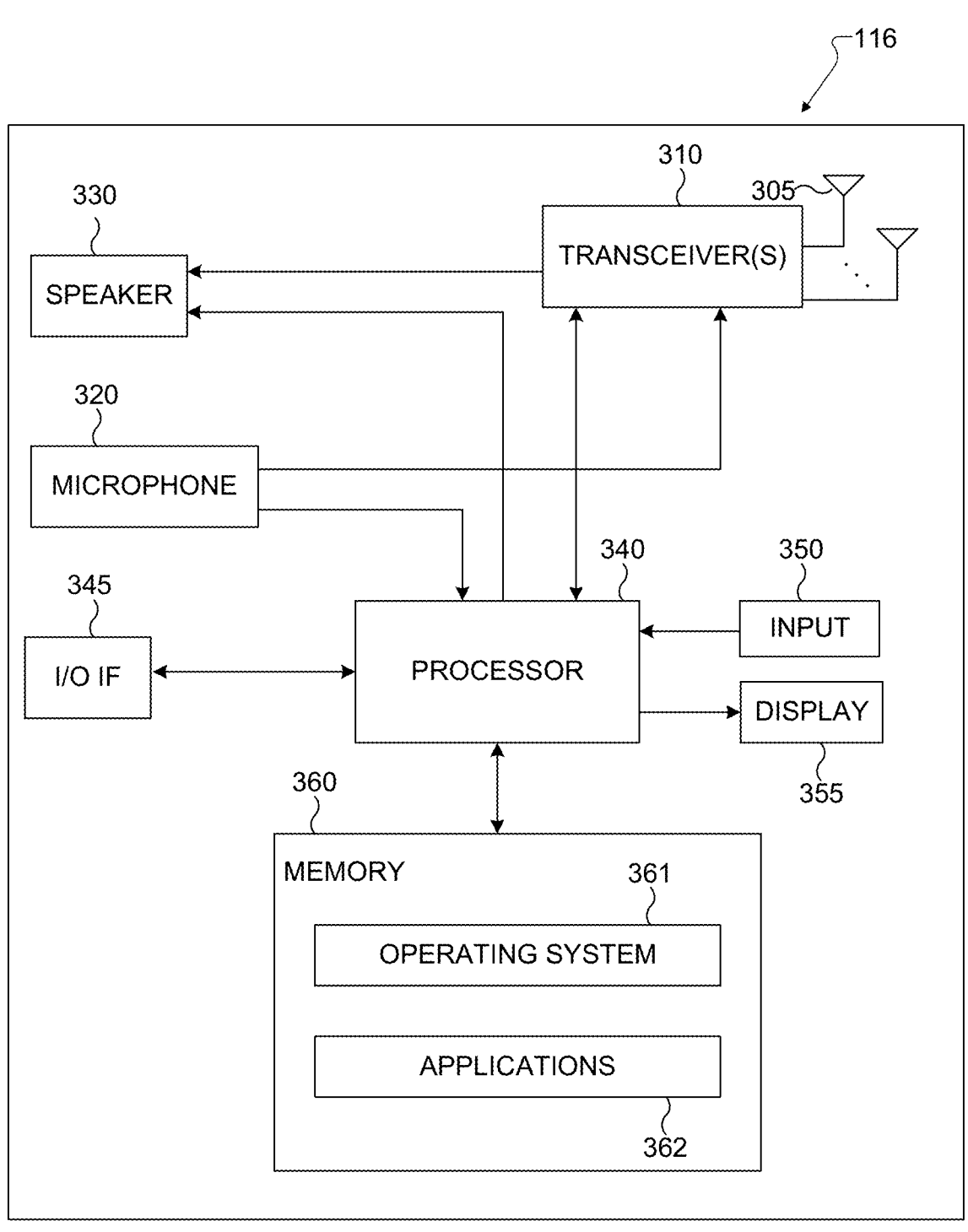
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), WiFi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for transmission mode adaptation in NR with AI/ML assistance. In certain embodiments, one or more of the gNBs 101-103 includes circuitry, programing, or a combination thereof, to support transmission mode adaptation in NR with AI/ML assistance in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS and, for example, processes to support a transmission mode adaptation in NR with AI/ML assistance as discussed in greater detail below. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for a transmission mode adaptation in NR with AI/ML assistance as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
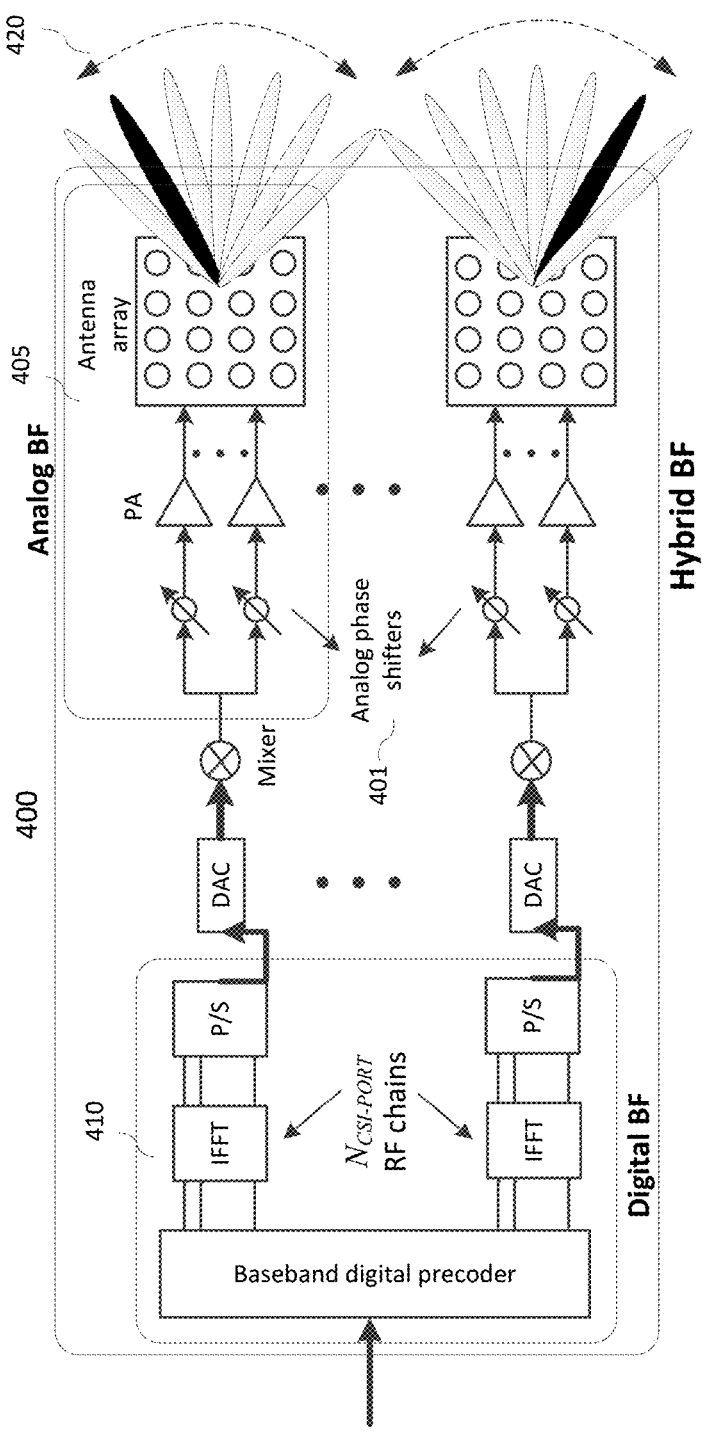
FIG. 4 illustrates example antenna blocks or arrays according to embodiments of the present disclosure.

FIG. 4 illustrates example antenna blocks or arrays 400 according to embodiments of the present disclosure. The embodiment of the antenna blocks or arrays 400 illustrated in FIG. 4 is for illustration only. Different embodiments of antenna blocks or arrays 400 could be used without departing from the scope of this disclosure.

A unit for downlink (DL) signaling or for uplink (UL) signaling on a cell is referred to as a slot and may include one or more symbols. A bandwidth (BW) unit is referred to as a resource block (RB). One RB includes a number of sub-carriers (SCs). For example, a slot may have duration of one millisecond and an RB may have a bandwidth of 180 KHz and include 12 SCs with inter-SC spacing of 15 KHz. A slot may be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. A UE may be indicated a spatial setting for a PDCCH reception based on a configuration of a value for a transmission configuration indication state (TCI state) of a control resource set (CORESET) where the UE receives the PDCCH. The UE may be indicated by a spatial setting for a PDSCH reception based on a configuration by higher layers or based on activation or indication by MAC CE or based on an indication by a DCI format scheduling the PDSCH reception of a value for a TCI state. The gNB may configure the UE to receive signals on a cell within a DL bandwidth part (BWP) of the cell DL BW.

A gNB (such as BS 103 of FIG. 1) transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources. A UE (such as UE 116 of FIG. 1) may determine CSI-RS transmission parameters through DL control signaling or higher layer signaling, such as an RRC signaling from a gNB. Transmission instances of a CSI-RS may be indicated by DL control signaling or configured by higher layer signaling. A DMRS is transmitted only in the BW of a respective PDCCH or PDSCH and a UE may use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH may be transmitted over a variable number of slot symbols including one slot symbol.

The gNB may configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information may be configured to be with a smaller granularity than per TB and may be per data code block (CB) or per group of data CBs where a data TB includes a number of data.

A CSI report from a UE may include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB may use a DMRS to demodulate information in a respective PUSCH or PUCCH. SRS is transmitted by a UE to provide a gNB with an UL CSI and, for a TDD system, an SRS transmission may also provide a PMI for DL transmission. Additionally, in order to establish synchronization or an initial higher layer connection with a gNB, a UE may transmit a physical random-access channel (PRACH).

Rel-14 LTE and Rel-15 NR support up to 32 CSI-RS antenna ports which enable an eNB or a gNB to be equipped with a large number of antenna elements (such as 64 or 128). A plurality of antenna elements may then be mapped onto one CSI-RS port. For mmWave bands, although a number of antenna elements may be larger for a given form factor, a number of CSI-RS ports, that may correspond to the number of digitally precoded ports, may be limited due to hardware constraints (such as the feasibility to install a large number of ADCs/DACs at mmWave frequencies) as illustrated in FIG. 4. Then, one CSI-RS port may be mapped onto a large number of antenna elements that may be controlled by a bank of analog phase shifters 401. One CSI-RS port may then correspond to one sub-array which produces a narrow analog beam through analog beamforming 405. This analog beam may be configured to sweep across a wider range of angles (420) by varying the phase shifter bank across symbols or slots/subframes. The number of sub-arrays (equal to the number of RF chains) is same as the number of CSI-RS ports NCSI-PORT A digital beamforming unit 410 performs a linear combination across NCSI-PORT analog beams to further increase a precoding gain. While analog beams are wideband (hence not frequency-selective), digital precoding may be varied across frequency sub-bands or resource blocks. Receiver operation may be conceived analogously.

Since the above system utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz. In this case, the system may employ only analog beams. Due to the O2 absorption loss around 60 GHz frequency (~10 dB additional loss per 100 m distance), a larger number and narrower analog beams (hence larger number of radiators in the array) are needed to compensate for the additional path loss.

Although FIG. 4 illustrates one example antenna blocks or arrays 400, various changes may be made to FIG. 4. For example, various components in FIG. 4 could be combined, further subdivided, or omitted and additional components could be added according to particular needs.

In modern wireless systems, such as those described regarding FIGS. 1-4, different modes of operation may be utilized for MIMO transmissions. For example, in some circumstances MIMO transmissions may utilize a precoding matrix indicator (PMI) mode. In other circumstances, a transmit antenna selection (TAS) mode may be utilized. Depending on the circumstances, for example the conditions near a BS, the position of a UE, etc. better throughput (tput) may be obtained by utilizing PMI mode, while in other circumstances better throughput may be obtained by utilizing TAS mode. For instance, it has been observed that in strong line of sight (LOS) conditions that performance may be degraded when utilizing TAS rather than PMI. To improve throughput performance, it may be beneficial to dynamically alternate between MIMO modes as conditions change. The present disclosure describes methods of MIMO mode adaptation for NR downlink (DL) single user (SU) transmission by using metrics available at gNB side such as history of MIMO mode selected for DL transmission, CSI feedback report, DL transmission info including MCS, DL layer and ACK/NAKC etc.

Figure 5:
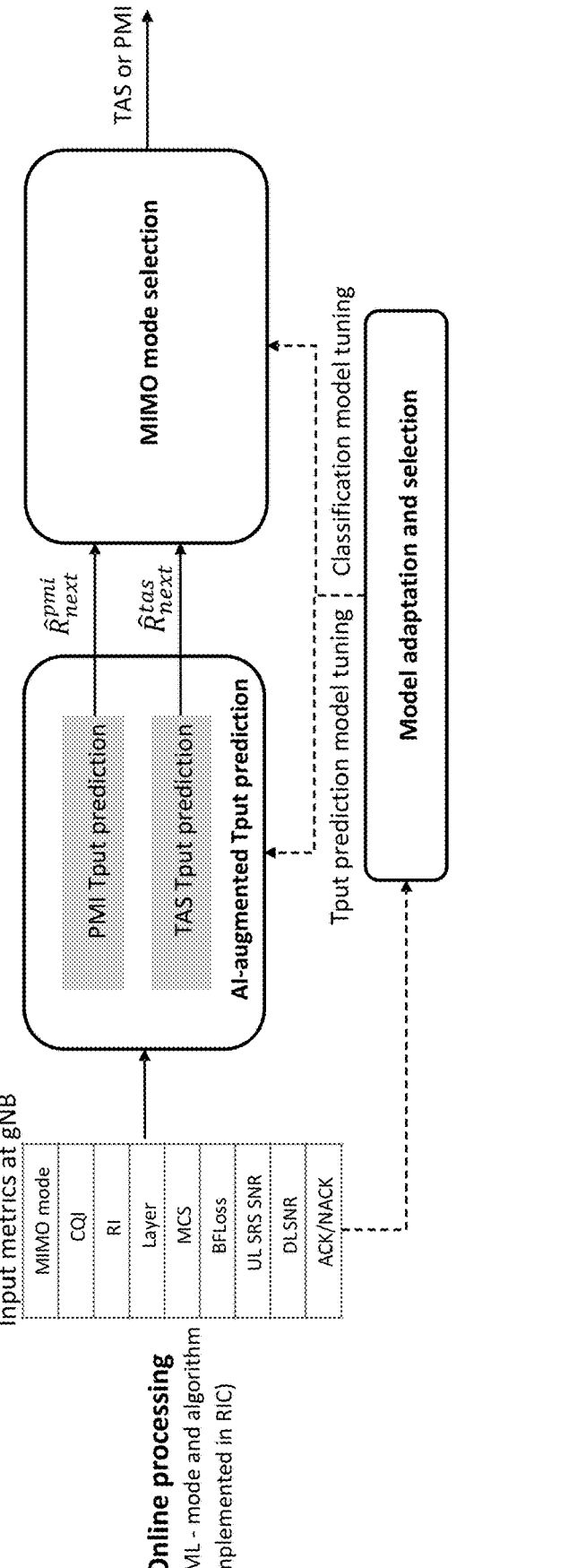
FIG. 5 illustrates an example block diagram for a MIMO mode adaptation method according to embodiments of the present disclosure.

FIG. 5 illustrates an example block diagram for a MIMO mode adaptation method 500 according to embodiments of the present disclosure. The embodiment of the AI-augmented MIMO mode adaptation method in FIG. 5 is for illustration only. Other embodiments of an AI-augmented MIMO mode adaptation method could be used without departing from the scope of this disclosure.

In the example of FIG. 5, the MIMO mode adaptation method may be performed by a BS (such as BS 103 of FIG. 1). As illustrated in the example of FIG. 5, the MIMO mode adaptation method comprises three modules: 1) Throughput prediction of candidate MIMO modes, 2) MIMO mode selection and 3) online parameter tuning.

In one embodiment, the DL MIMO mode for the next time interval may be determined as follows: first, the predicted throughput of TAS and PMI, denoted by $$\hat{R}_{next}^{tas}$$

and $$\hat{R}_{next}^{pmi}$$

respectively, may be obtained by the throughput prediction module. Then the MIMO mode selection module may take the predicted throughput as input and output the DL MIMO mode for the next time interval. Meanwhile, the measured throughput of each time interval with the corresponding MIMO mode may be collected and processed by the online learning module which may then adjust parameters in both throughput prediction module and MIMO mode selection module.

The throughput prediction module:
1) may contain models for throughput prediction given different DL beamforming (BF) mode, e.g., PMI and TAS,
2) may select either global model or local models for prediction by historical prediction performance, and
3) may retire local models for x-mode prediction if not updated.

The tput prediction may comprise tput prediction for the current mode and cross-mode (x-mode). In one embodiment, the x-mode throughput prediction given each DL BF mode may contain two available models. One model may be a global model obtained offline, and the other may be a local model which is either UE or cell specific and may be updated by metrics available at the gNB side during online operations. In another embodiment, multiple global models are applied for each DL BF modes. In another embodiment, multiple local models are applied for each DL BF mode. In another embodiment, multiple global models and multiple local models are used for each DL BF mode.

In one embodiment, the global and local model for predicting the throughput of mode # given a current mode as * may be denoted by $f_{G_k:*\rightarrow\#}$ and $F_{L_p:*\rightarrow\#}$, where k=1, . . . , K, p=1, . . . P, #,*∈{PMI, TAS} and #≠*. $f_{G:*\rightarrow\#}$ may be generated offline with sufficient training data collected in different environment so that $f_{G:*\rightarrow\#}$ may provide good prediction accuracy given different channel conditions. In one embodiment, the global model may be fixed during online operation. In another embodiment, the global model may be updated given data from multiple cells. Updating the global model may make it more suitable for a specific environment but may require more computational resources.

In another example, $f_{L_p:*\rightarrow\#}$ may be initialized by $f_{G_k:*\rightarrow\#}$ and may be updated given online collected data. Thus, $f_{L_p:*\rightarrow\#}$ may outperform $f_{G_k:*\rightarrow\#}$ after certain updates as long as the environment does not change drastically. In one embodiment, all the UEs in a cell may share the same $f_{L_p:*\rightarrow\#}$. i.e., $f_{L_p:*\rightarrow\#}$ may be updated by given collected data for all (or a subset of) the UEs in the cell. In another embodiment, multiple UEs in a cell may share the same $f_{L_p:*\rightarrow\#}$. In another embodiment, each UE may have its own $f_{L_p:*\rightarrow\#}$ and may be updated by only the data collected for the UE.

In another embodiment, $f_{C_q:*\rightarrow*}$ may denote a model for predicting the throughput of mode * given current mode as * for the next time interval, where q=1, . . . , Q. If the current mode is PMI, then
$f_{G_k:pmi\rightarrow tas}$'s, $f_{L_p:pmi\rightarrow tas}$'s and $f_{C_q:pmi\rightarrow pmi}$'s may be used for throughput prediction,
$f_{G_k:tas\rightarrow pmi}$'s may be evaluated, and
$f_{L_p:tas\rightarrow pmi}$'s may be updated and evaluated.
In one embodiment, $f_{C:*\rightarrow*}$ may take the measured throughput for the time intervals with * as the DL BF mode and output the predicted throughput for current MIMO mode. In another embodiment, $f_{C:*\rightarrow*}$ may take both the measured throughput and other metrics including CQI, RI and PMI and output the predicted throughput for current MIMO mode.

An example set of throughput prediction functions given different current MIMO Mode is summarized in Table 1.

TABLE 1

| Summary of throughput prediction models | | |
| --- | --- | --- |
| | Current Mode: PMI | Current Mode: TAS |
| Throughput prediction (Directly Used by MIMO mode selection) | $f_{G_k:\ pmi\rightarrow tas}$ $f_{L_p:\ pmi\rightarrow tas}$ $f_{C_q:\ pmi\rightarrow pmi}$ | $f_{G_k:\ tas\rightarrow pmi}$ $f_{L_p:\ tas\rightarrow pmi}$ $f_{C_q:\ tas\rightarrow tas}$ |
| Model evaluate | $f_{G_k:\ tas\rightarrow pmi}$ | $f_{G_k:\ tas\rightarrow pmi}$ |
| Model update and evaluate | $f_{L_p:\ tas\rightarrow pmi}$ | $f_{L_p:\ tas\rightarrow pmi}$ |

Given both a global and local model for x-mode throughput prediction, the system may need to determine the final throughput prediction results for x-mode prediction.

In one embodiment, either $f_{G_k\rightarrow\#}$ or $f_{L_p:*\rightarrow\#}$ may be selected for predicting throughput of MIMO mode # given current MIMO mode as *. The selection criterion may be that the model that has smaller throughput prediction error in history will be selected. The history of throughput prediction error of $f_{G_k:*\rightarrow\#}$ and $f_{L_p:*\rightarrow\#}$, denoted by $Err_{G_k:*\rightarrow\#}$ and $Err_{L_p:*\rightarrow\#}$, respectively, may be computed whenever the current MIMO mode is # in previous time intervals. i.e., $$\hat{R}_{next}^{\#} = f_{G_k:*\rightarrow\#} \text{ or } \hat{R}_{next}^{\#} = f_{L_p:*\rightarrow\#}$$

depending on the throughput prediction error in history. In one embodiment, the filtered prediction errors for both $f_{G_k:*\rightarrow\#}$'s and $f_{L_p:*\rightarrow\#}$'s may be computed and the one with the smaller filtered error will be selected. In another embodiment, the maximum prediction error for both global and local model may be computed and the one with the smaller error may be selected. In another embodiment, the x-mode prediction model with lower median prediction error may be selected. In another embodiment, the model $f_{G_k:*\rightarrow\#}$ or $f_{L_p:*\rightarrow\#}$, with the highest preference weight provided by the online learning module may be selected for throughput prediction.

In one embodiment, the x-mode throughput prediction result may be the combination of the throughput prediction given $f_{G_k:*\rightarrow\#}$'s and $f_{L_p:*\rightarrow\#}$'s. The combination weight may be determined by the prediction error in history. i.e., $$\hat{R}_{next}^{\#} = g_x\left(f_{G_1:*\rightarrow\#}, \ldots, f_{G_K:*\rightarrow\#}, f_{L_1:*\rightarrow\#}, \ldots, f_{L_P:*\rightarrow\#}\right).$$

In one embodiment, the larger weight may be applied to the model with lower prediction error. In one embodiment, $$\hat{R}_{next}^{\#} = \sum_k \omega_{G_k:*\rightarrow\#} f_{G_k:*\rightarrow\#} + \sum_p \omega_{L_p:*\rightarrow\#} f_{L_p:*\rightarrow\#},$$

where $\omega_{G_k}$ and $\omega_{L_p}$ are functions of the prediction error of $f_{G_k:*\rightarrow\#}$ and $f_{L_p:*\rightarrow\#}$, respectively. In another embodiment, the x-mode throughput prediction result may be the combination of a subset of all the throughput prediction results provided by different throughput prediction models. For instance, $$\hat{R}_{next}^{\#} = \sum_k \omega_{G_k:*\rightarrow\#} f_{G_k:*\rightarrow\#} + \sum_p \omega_{L_p:*\rightarrow\#} f_{L_p:*\rightarrow\#},$$

where some $\omega_{G_k:* \to \#}$'s and $\omega_{L_p:* \to \#}$'s are zero if the corresponding $f_{G_k:* \to \#}$ and $f_{L_p:* \to \#}$ have large prediction error. In another embodiment, the combination is done for global or local models only. For instance, $$\hat{R}_{next}^{\#} = \sum_p \omega_{L_p:* \to \#} f_{L_p:* \to \#} \text{ or } \hat{R}_{next}^{\#} = \sum_k \omega_{G_k:* \to \#} f_{G_k:* \to \#}.$$

In another embodiment, the combination may be done for a subset of global or local models only. For instance, $$\hat{R}_{next}^{\#} = \sum_p \omega_{L_p:* \to \#} f_{L_p:* \to \#} \text{ or } \hat{R}_{next}^{\#} = \sum_k \omega_{G_k:* \to \#} f_{G_k:* \to \#},$$

where some $\omega_{G_{k^*} \to \#}$'s and $\omega_{L_{p:*} \to \#}$'s are zero if the corresponding $f_{G_k:* \to \#}$ and $f_{L_p:* \to \#}$ have large prediction error. In another embodiment, the combination may be done for $S_1$ models with the smallest prediction error.

In another embodiment, equal weights may be applied to all models for x-mode prediction.

Similarly, the throughput prediction for the current mode may also be obtained by either a single model or combining the prediction of different models. In one embodiment the history of throughput prediction error of $f_{C_1:* \to *}$ may be denoted by $Err_{C_q:* \to *}$, which may be computed whenever the current MIMO mode is # in previous time intervals. In one embodiment, the filtered prediction errors for $f_{C_q:* \to *}$'s may be computed and the one with the smaller filtered error may be selected. In another embodiment, the maximum prediction error for both a global and local model may be computed and the model with the smaller error may be selected. In another embodiment, the x-mode prediction model with lower median prediction error may be selected. In another embodiment, the model $f_{C_q:* \to *}$ with the highest preference weight provided by the online learning module may be selected for throughput prediction.

In one embodiment, the current-mode throughput prediction result may be the combination of the throughput prediction given $f_{C_q:* \to *}$'s. For instance, $$\hat{R}_{next}^{*} = g_C(f_{C_1:* \to *}, \dots, f_{C_Q:* \to *})$$

if the DL BF mode for the current time interval is *. In one embodiment, $$\hat{R}_{next}^{*} = \sum_q \omega_{C_q:* \to *} f_{C_q:* \to *},$$

where $\omega_{C_q:* \to *}$ is a function of the prediction error of $f_{C_q:* \to *}$. In another embodiment, $$\hat{R}_{next}^{*} = \sum_q \omega_{C_q:* \to *} f_{C_q:* \to *},$$

where some $\omega_{C_q:* \to *}$'s are zero if the corresponding $f_{C_q:* \to *}$'s have large prediction error.

Recall that $f_{L:* \to \#}$ may be updated by data collected online given MIMO mode as #, which may help to improve the prediction accuracy under similar channel conditions. However, the environment changes as the UE moves. Thus, even though $f_{L:* \to \#}$ may outperform $f_{G:* \to \#}$ initially, $f_{L:* \to \#}$ is likely to be worse than $f_{G:* \to \#}$ if there is no update for $f_{L:* \to \#}$ for a long time. i.e., If the system stays in MIMO mode * for a long time, the performance of $f_{L:* \to \#}$ may degrades and can be worse than $f_{G:* \to \#}$. In one embodiment, if $f_{L:* \to \#}$ has been used for x-mode throughput prediction for at most N consecutive time intervals, then $f_{G:* \to \#}$ may be selected for throughput prediction starting from the N+1 time intervals and/or set $f_{L_p:* \to \#} = f_{G:* \to \#}$. In another embodiment, the weight of $f_{L:* \to \#}$ for combining with $f_{G:* \to \#}$ may be decreased if * is used as DL BF mode for more than N consecutive time intervals.

If multiple global models exist for x-mode throughput prediction given the current mode as *, then $f_{L_p:\# \to *}$ may be reset to one of the global models if the training error exceeds some threshold. In one embodiment, $f_{L_p:\# \to *} = f_{G_k:\# \to *}$, where $f_{G_k \# \to *}$ for $k \in \{1, \dots, K_G\}$ denotes the k-th global model for x-mode prediction given current mode as #, if the training error of $f_{L_p:\# \to *}$ exceeds some threshold and $f_{G_k \# \to *}$ has the smallest training error that does not correspond to any existing local models. In another embodiment, $f_{G_k:\# \to *}$ for $k \in \{1, \dots, K_G\}$ are trained under different channel conditions, $f_{L_p:\# \to *}$ may be reset according to current channel condition. In another embodiment, $f_{L_p:\# \to *} = f_{G_k:\# \to *}$ if the training error of $f_{L_p:\# \to *}$ exceeds some threshold.

In one embodiment, the MIMO mode selection module may take the predicted throughput from throughput prediction module and select a MIMO mode for DL transmission in the next time interval. This may include the following features:

1. Adding uncertainty for predicted throughput given a local model for robust switch.
2. Adding uncertainty for predicted throughput given a global model given low error for robust switch.
3. Adding uncertainty for predicted throughput to encourage exploration given a global model given high error.

In one embodiment, all the three features may be enabled in the MIMO mode selection module. In another embodiment a subset of the three features may be enabled.

The MIMO mode selection module may directly compare predicted throughput and make decision. In one embodiment, the MIMO mode for next time interval may be deterministically selected given predicted throughput provided by the throughput prediction module. For instance, if $$\hat{R}_{next}^{tas} \gtrless \hat{R}_{next}^{pmi} \text{ or } \frac{\hat{R}_{next}^{tas}}{\hat{R}_{next}^{pmi}} \lessgtr \alpha,$$

then TAS/PMI may be selected as the MIMO mode for the next time interval, where $\alpha$ is a tunable parameter. In another embodiment, the selected MIMO mode for the next time interval may be probabilistically determined. For instance, if $$\hat{R}_{next}^{tas} > \hat{R}_{next}^{pmi},$$

then TAS may be selected as the MIMO mode for next time interval with probability=p, where $p \in (0,1)$ is either a predefined value or a function of the gap between the predicted throughput between different MIMO modes. In one embodiment, $$p = \frac{1}{1 + \exp\left(-\left(\hat{R}_{next}^{tas} - \hat{R}_{next}^{pmi}\right)\right)}.$$

15 | 16

Furthermore, the MIMO mode selection module may combine the predicted throughput and the corresponding uncertainty for comparison. In one embodiment, $$\hat{R}_{next}^{tas} + \tilde{R}_{uncertainty}^{tas} \text{ and } \hat{R}_{next}^{pmi} + \tilde{R}_{uncertainty}^{pmi}$$

may be compared, where $$\tilde{R}_{uncertainty}^{tas} \text{ and } \tilde{R}_{uncertainty}^{pmi}$$

are the uncertainties of the predicted throughput for TAS and PMI, respectively, and may be obtained from either collected field and/or simulation data. In another embodiment $$\tilde{R}_{uncertainty}^{tas} \text{ and } \tilde{R}_{uncertainty}^{pmi}$$

may be updated during online operation. Then the MIMO mode for next time interval may be determined by $$\hat{R}_{next}^{tas} + \tilde{R}_{uncertainty}^{tas} \gtreqless \hat{R}_{next}^{pmi} + \tilde{R}_{uncertainty}^{pmi}.$$

The uncertainty $$\tilde{R}_{uncertainty}^{\#} \text{ for } \# \in \{PMI, TAS\}$$

may depend on the current MIMO mode and the history of the prediction error for selected cross mode throughput prediction model. Assume that the MIMO mode * has been selected for M consecutive intervals. In one embodiment, $$\tilde{R}_{uncertainty}^{*} = 0$$

and
If $f_{L:* \to \#}$ is selected for cross-mode prediction, then $$\tilde{R}_{uncertainty}^{\#} = \begin{cases} \theta_{L1} \text{ if } M \le N_1 \\ \theta_{L2} \text{ if } M > N_1 \end{cases},$$

where $\theta_{L1}$ is a small negative number to ensure robust switch, $\theta_{L2}$ is a large positive number to encourage exploration, $N_1$ is a pre-determined parameter and $\# \ne *$.
If $f_{G:* \to \#}$ is selected for cross-mode prediction, then $$\tilde{R}_{uncertainty}^{\#} = \theta_G,$$

where $\theta_G$ is a large positive number to encourage exploration, and $\# \ne *$.
In another embodiment, $$\tilde{R}_{uncertainty}^{*} = 0$$

and
If $f_{L:* \to \#}$ is selected for cross-mode prediction, then $$\tilde{R}_{uncertainty}^{\#} = \begin{cases} \theta_{L1} \text{ if } M \le N_2 \\ \theta_{L2} \text{ if } M > N_2 \end{cases},$$

where $N_2$ is a pre-determined parameter and $\# \ne *$;
If $f_{G:* \to \#}$ is selected, then $$\tilde{R}_{uncertainty}^{\#} = \begin{cases} \theta_{G1} \text{ if } Err_{G:* \to \#} \le Err_{mG} \text{ and } M \le N_3 \\ \theta_{G2} \text{ if } Err_{G:* \to \#} \le Err_{mG} \text{ and } M > N_3 \\ \theta_{G2} \text{ if } Err_{G:* \to \#} > Err_{mG} \end{cases},$$

where $\theta_{G1}$ is a small negative number to ensure robust switch, $\theta_{G2}$ is a large positive number to encourage exploration, $Err_{mG}$ is a pre-determined error threshold, $N_3$ is a pre-determined parameter and $\# \ne *$.

In one embodiment, $\theta$'s may be determined by the distribution of prediction errors during offline test. In another embodiment, $\theta$'s may be updated during online operation.

In one embodiment, the online learning module may:
1. Update model preference for both global model and local model, which is used for model selection.
2. Reset the local model if the training error is large for current mode.
3. Update the parameters of the local model.

Suppose that the current MIMO mode is *, where $* \in \{PMI, TAS\}$ the online learning module may be configured to:
    update and evaluate $f_{L:* \# \to *}$ and
    select between $f_{G:\# \to *}$ and $f_{L:* \# \to *}$ for throughput prediction if MIMO mode switches from * to # in the next time interval.

In one embodiment, $h_{G_k:* \to \#}$ and $h_{L_p:* \to \#}$ may denote the preference weight of the k-th global and the p-th local model for predicting the throughput of mode # given current mode as *, where $\#, * \in \{PMI, TAS\}$. In general, smaller prediction error in history may imply larger preference weight for each model.

TABLE 1

| Summary of throughput prediction models | | |
|---|---|---|
| | Current Mode: PMI | Current Mode: TAS |
| Preference update | $h_{G_k}$: tas→pmi<br>$h_{L_p}$: tas→pmi<br>$h_{C_q}$: pmi→pmi | $h_{G_k}$: tas→pmi<br>$h_{L_p}$: tas→pmi<br>$h_{C_q}$: tas→tas |

Suppose the current MIMO mode is #. In one embodiment, all the UEs in a cell may share the same $h_{G_k:* \to \#}$ and $h_{L_p:* \to \#}$, i.e., $h_{G_k:* \to \#}$ and $h_{L_p:* \to \#}$ may be updated by a prediction error of all the UEs in the cell. In another embodiment, each UE may have its own $h_{G_k:* \to \#}$ and $h_{L_p:* \to \#}$ and preference weight may be updated by only the prediction error of the UE. In one embodiment, the preference weight of an instantaneous prediction may be given by $f_{G_k:* \to \#}$, $f_{L_p:* \to \#}$ and $f_{C_q:\# \to \#}$ may be obtained by $$1 - \min\left\{ \left| \frac{R^* - f_{G_k:* \to \#}}{R^{\#}} \right|, ErrR_{max,1}^{\#} \right\}, 1 -$$

-continued $$\min\left\{\left|\frac{R^* - f_{L_p:*\to\#}}{R^\#}\right|, ErrR^\#_{max,2}\right\} \text{ and } 1 - \min\left\{\left|\frac{R^* - f_{C_q:*\to\#}}{R^\#}\right|, ErrR^\#_{max,3}\right\},$$

respectively, where $R^\#$ is the measured throughput in the current time interval given MIMO mode as # and $$ErrR^\#_{max,i} > 0$$

for $i \in \{1,2,3\}$ are pre-defined parameters. Then $h_{G_k:*\to\#}$, $h_{L_p:*\to\#}$ and $h_{C_q:*\to\#}$ may be the filtered output of instantaneous preference weights. For instance, $$h_{G_k:*\to\#} = \alpha_1 h_{G_k:*\to\#} + (1 - \alpha_1)\left(1 - \min\left\{\left|\frac{R^\# - f_{G_k:\#\to\#}}{R^\#}\right|, ErrR^\#_{max,1}\right\}\right),$$

$$h_{L_p:*\to\#} = \alpha_2 h_{L_p:*\to\#} + (1 - \alpha_2)\left(1 - \min\left\{\left|\frac{R^\# - L_{p_q:\#\to\#}}{R^\#}\right|, ErrR^\#_{max,2}\right\}\right),$$

$$h_{C_q:*\to\#} = \alpha_3 h_{C_q:*\to\#} + (1 - \alpha_3)\left(1 - \min\left\{\left|\frac{R^\# - f_{C_q:\#\to\#}}{R^\#}\right|, ErrR^\#_{max,3}\right\}\right),$$

where $\alpha_i \in [0,1]$ for $i \in \{1,2,3\}$ are the filter coefficient.

The preference weight may be used to 1) select the tput prediction model and 2) determine the weight for combing the tput prediction results provided by different x-mode tput models. In one embodiment, the x-mode prediction model with the highest preference weight may be selected. In another embodiment, the combing weight of x-mode prediction may be a function of preference weights. For example, $$\omega_{G_k:*\to\#} = \frac{h_{G_k:*\to\#}}{\Sigma_k h_{G_k:*\to\#} + \Sigma_p h_{L_p:*\to\#}} \text{ and } \omega_{L_p:*\to\#} = \frac{h_{L_p:*\to\#}}{\Sigma_k h_{G_k:*\to\#} + \Sigma_p h_{L_p:*\to\#}}.$$

In another embodiment, the combining weight of $f_{G_k:\#\to*}$ and $f_{L_p:\#\to*}$ for some k's and p's may be set to be zero. In one embodiment, $h_{C_q:*\to\#}$ with the highest preference weight for all $q \in \{1, \ldots, Q\}$ may be selected. In another embodiment, $h_{C_q:\#\to\#}$'s may be combined by weights $$\omega_{C_q:\#\to\#} = \frac{h_{C_q:\#\to\#}}{\Sigma_q h_{C_q:\#\to\#}}.$$

In another embodiment, the combining weight of $h_{C_q:\#\to\#}$ for some q's may be set to be zero.

In one embodiment, the throughput prediction module may take metrics available at the gNB side and output throughput prediction results periodically. Those metrics may include but are not limited to MIMO mode of current time interval, CQI, RI, SRS SINR, beamforming (BF) loss, etc. In one embodiment, the Throughput prediction for each DL MIMO mode may be a function of history of measured throughput given the MIMO mode and the throughput predicted by metrics available at the gNB side. The throughput prediction of current DL MIMO mode may weight more on the history of measured throughput whereas that of candidate DL MIMO mode may weight more on the throughput predicted by metrics. In one embodiment, the maximum predicted throughput may be capped by system design. In another embodiment, the predicted throughput may be capped by field test results.

In one embodiment, the throughput prediction module may use one model to predict the throughput given TAS and PMI, respectively. In another embodiment, the throughput prediction module may first select models for throughput prediction based on their historical prediction performance and then may use the selected models for throughput prediction.

One model may be used to predict throughput for TAS and PMI, respectively. In one embodiment, the throughput predicted by metrics may be a function of average CQI and RI. For instance, the PMI and TAS throughput may be predicted by the following formula $$\hat{R}^*_{next} = \min\left\{\alpha_1^* SE\left(\frac{1}{N}\sum_{n=1}^{N}(CQI_n)\right) \times \frac{1}{N}\sum_{n=1}^{N}(RI_n), R^*_{max}\right\},$$

where $$\alpha_1^*$$

is the scaling factor for MIMO mode $* \in \{PMI, TAS\}$, $SE(\bullet)$ is the mapping from CQI to spectral efficiency, N is the total number of CSI feedback report received in current time interval and $$R^*_{max}$$

is the maximum achievable throughput given * as DL BF mode.

In one embodiment, $$\alpha_1^*$$

may be determined by offline training only. In another embodiment, $$\alpha_1^*$$

may be adjusted by the online learning module after offline training is done. In another embodiment, the predicted throughput may be obtained by averaging the instantaneous predicted throughput given each CSI feedback report:

$$\hat{R}^*_{next} = \min\left\{\alpha_2^* \frac{1}{N}\sum_{n=1}^{N}(SE(CQI_n) \times RI_n), R^*_{max}\right\},$$

where $$\alpha_2^*$$

is the scaling factor for MIMO mode $* \in \{\text{PMI, TAS}\}$. In one embodiment, $$\alpha_2^*$$

may be determined by offline training only. In another embodiment, $$\alpha_2^*$$

may be adjusted by the online learning module after offline training is done.

In another embodiment, the predicted throughput is the scaled product of the spectral efficiency mapped from CQI and RI, where the scaling factor is RI independent:

$$\hat{R}_{next}^* = \min\left\{\frac{1}{N}\sum_{n=1}^{N}\alpha_3^*(RI_n) \times (SE(CQI_n) \times RI_n), R_{max}^*\right\},$$

where $$\alpha_3^*$$

is the scaling factor for MIMO mode $* \in \{\text{PMI, TAS}\}$. In one embodiment, $$\alpha_3^*$$

is determined by offline training only. In another embodiment, $$\alpha_3^*$$

can be adjust by online learning module after offline training is done.

In another embodiment, the predicted throughput may be the scaled product of the spectral efficiency mapped from CQI and non-linearized RI. The non-linearization of RI may take a rank overriding scheme at the gNB side into account and may achieve better throughput prediction results:

$$\hat{R}_{next}^* = \min\left\{\alpha_4^* SE\left(\frac{1}{N}\sum_{n=1}^{N}(CQI_n)\right) \times \left(\frac{1}{N}\sum_{n=1}^{N}(RI_n)\right)^{\beta^*}, R_{max}^*\right\},$$

where $\beta^* \in (0,1)$, where $$\alpha_4^*$$

is the scaling factor for MIMO mode $* \in \{\text{PMI, TAS}\}$. In one embodiment, $$\alpha_4^*$$

and $\beta^*$ may be determined by offline training only. In another embodiment, $$\alpha_4^*$$

and $\beta^*$ may be adjusted by the online learning module after offline training is done.

The scaling factor in the throughput prediction model may be a function of other metrics available in a gNB including but not limited to measured throughput, SRS SINR, beamforming loss, etc. In one embodiment, $$\hat{R}_{next}^* = \min$$

$$\left\{\alpha_5^*\left(\frac{1}{M}\sum_{m=1}^{M}SRS\ SINR_m\right) \times SE\left(\frac{1}{N}\sum_{n=1}^{N}(CQI_n)\right) \times \frac{1}{N}\sum_{n=1}^{N}(RI_n), R_{max}^*\right\},$$

where $$\alpha_5^*(\cdot)$$

may be a function of SRS SINR obtained between $CQI_1$ and $CQ_n$ and UE speed. In one embodiment, $$\alpha_5^*(\cdot)$$

may be a function of the average SRS SINR obtained between $CQI_1$ and $CQI_n$. In another embodiment, $$\alpha_5^*(\cdot)$$

may be a function of average UE speed. For instance, $$\alpha_5^*(\cdot)$$

may be a decreasing function of average UE speed. In one embodiment, $$\alpha_5^*$$

may be determined by offline training only. In another embodiment, $$\alpha_5^*$$

may be adjusted by the online learning module after offline training is done.

In another embodiment, $$\hat{R}^*_{next} = \min\left\{\frac{1}{N}\sum_{n=1}^{N}\alpha^*_{6,n}(SRS\ SINR_n)\times(SE(CQI_n)\times RI_n),\ R^*_{max}\right\},$$

where $$\alpha^*_{6,n}(\cdot)'s$$

are functions of SRS SINR obtained between $CQI_{n-1}$ and $CQI_n$ and UE speed. In one embodiment, $$\alpha^*_{6,n}(\cdot)'s$$

may be functions of average SRS SINR obtained between $CQI_{n-1}$ and $CQI_n$. In another embodiment, $$\alpha^*_{6}(\cdot)$$

may be a function of average UE speed. For instance, $$\alpha^*_{6}(\cdot)$$

may be a decreasing function of average UE speed. In one embodiment, $$\alpha^*_{6,n}'s$$

may be determined by offline training only. In another embodiment, $$\alpha^*_{6,n}'s$$

may be adjusted by the online learning module after offline training is done.

One model may also be selected from multiple models to predict throughput under different conditions. In one embodiment, different throughput prediction models introduced previously (and corresponding parameters) may be used for both TAS and PMI given different ranges of metrics. In one embodiment, different parameters may be used for throughput prediction given $K_1$ different ranges of average CQI and RI.

In one embodiment, $$\hat{R}^*_{next} = \min\left\{\begin{cases}\alpha^*_{7,1}SE\left(\frac{1}{N}\sum_{n=1}^{N}(CQI_n)\right)\times\frac{1}{N}\sum_{n=1}^{N}(RI_n)\ \text{if}\ \frac{1}{N}\sum_{n=1}^{N}(CQI_n)\in(CQI,\ RI)\ \text{range}\ 1\\ \vdots\\ \alpha^*_{7,K}SE\left(\frac{1}{N}\sum_{n=1}^{N}(CQI_n)\right)\times\frac{1}{N}\sum_{n=1}^{N}(RI_n)\ \text{if}\ \frac{1}{N}\sum_{n=1}^{N}(CQI_n)\in(CQI,\ RI)\ \text{range}\ K\end{cases},\ R^*_{max}\right\},$$

where $\gamma_{cqi,k}$'s are a pre-determined threshold. In another embodiment, different models can be used for throughput prediction given $K_2$ different ranges of average CQI and RI.

In one embodiment $$\hat{R}^*_{next} = \min\left\{\begin{cases}\alpha^*_{8,1}SE\left(\frac{1}{N}\sum_{n=1}^{N}(CQI_n)\right)\times\frac{1}{N}\sum_{n=1}^{N}(RI_n)\ \text{if}\ \frac{1}{N}\sum_{n=1}^{N}(CQI_n)\in(CQI,\ RI)\ \text{range}\ 1\\ \alpha^*_{8,2}SE\left(\frac{1}{N}\sum_{n=1}^{N}(CQI_n)\right)\times\left(\frac{1}{N}\sum_{n=1}^{N}(RI_n)\right)^{\beta^*}\ \text{if}\ \frac{1}{N}\sum_{n=1}^{N}(CQI_n)\in(CQI,\ RI)\ \text{range}\ 2\\ \vdots\\ \alpha^*_{8,K}\frac{1}{N}\sum_{n=1}^{N}(SE(CQI_n)\times RI_n)\ \text{if}\ \frac{1}{N}\sum_{n=1}^{N}(CQI_n)\in(CQI,\ RI)\ \text{range}\ K\end{cases},\ R^*_{max}\right\}.$$

In one embodiment, (CQI, RI) range k's may be fixed during online operation. In another embodiment, (CQI, RI) range k's may be updated.

In one embodiment, (CQI, RI) range k's may be non-overlapped. In another embodiment, (CQI, RI) range k's may be over-lapped. If (CQI, RI) range m and (CQI, RI) range n are overlapped, the device may select one of the corresponding models for throughput prediction. In one embodiment the model with smaller prediction error may be used for tput prediction. In another embodiment, the throughput prediction result of these models may be combined.

The throughput prediction may also take UE mobility into account. In one embodiment, different throughput prediction models may be used given different UE speed ranges. For instance, $$\hat{R}_{next}^* = \min\left\{ \left\{ \begin{array}{l} \alpha_{9,1}^* SE\left(\frac{1}{N}\sum_{n=1}^{N}(CQI_n)\right) \times \frac{1}{N}\sum_{n=1}^{N}(RI_n) \ \text{if } UE \text{ speed} \in \text{range } 1 \\ \alpha_{9,2}^* SE\left(\frac{1}{N}\sum_{n=1}^{N}(CQI_n)\right) \times \left(\frac{1}{N}\sum_{n=1}^{N}(RI_n)\right)^{\beta^*} \ \text{if } UE \text{ speed} \in \text{range } 2 \\ \vdots \\ \alpha_{9,K}^* \frac{1}{N}\sum_{n=1}^{N}(SE(CQI_n) \times RI_n) \ \text{if } UE \text{ speed} \in \text{range } K \end{array} \right., R_{max}^* \right\}.$$

In another embodiment, the throughput prediction model itself may be a function of UE mobility.

TAS Throughput may also be predicted by other metrics which may result in good prediction accuracy. In one embodiment, the TAS Throughput predicted by metrics may be achieved by approximating DL SINR by UL SINR and BF loss. In another embodiment, the TAS Throughput predicted by metrics may be achieved by approximation DL SINR by UL SINR, BF loss, and time domain cross-correlation which is related to UE speed. In another embodiment, the DL SINR approximation may utilize different models given different ranges of metrics. For instance, different models may be used given different values of CQI and RI.

Although FIG. 5 illustrates one example of a MIMO mode adaptation method, various changes may be made to FIG. 5. For example, the input metrics may change, the models may change, etc.

Figure 6:
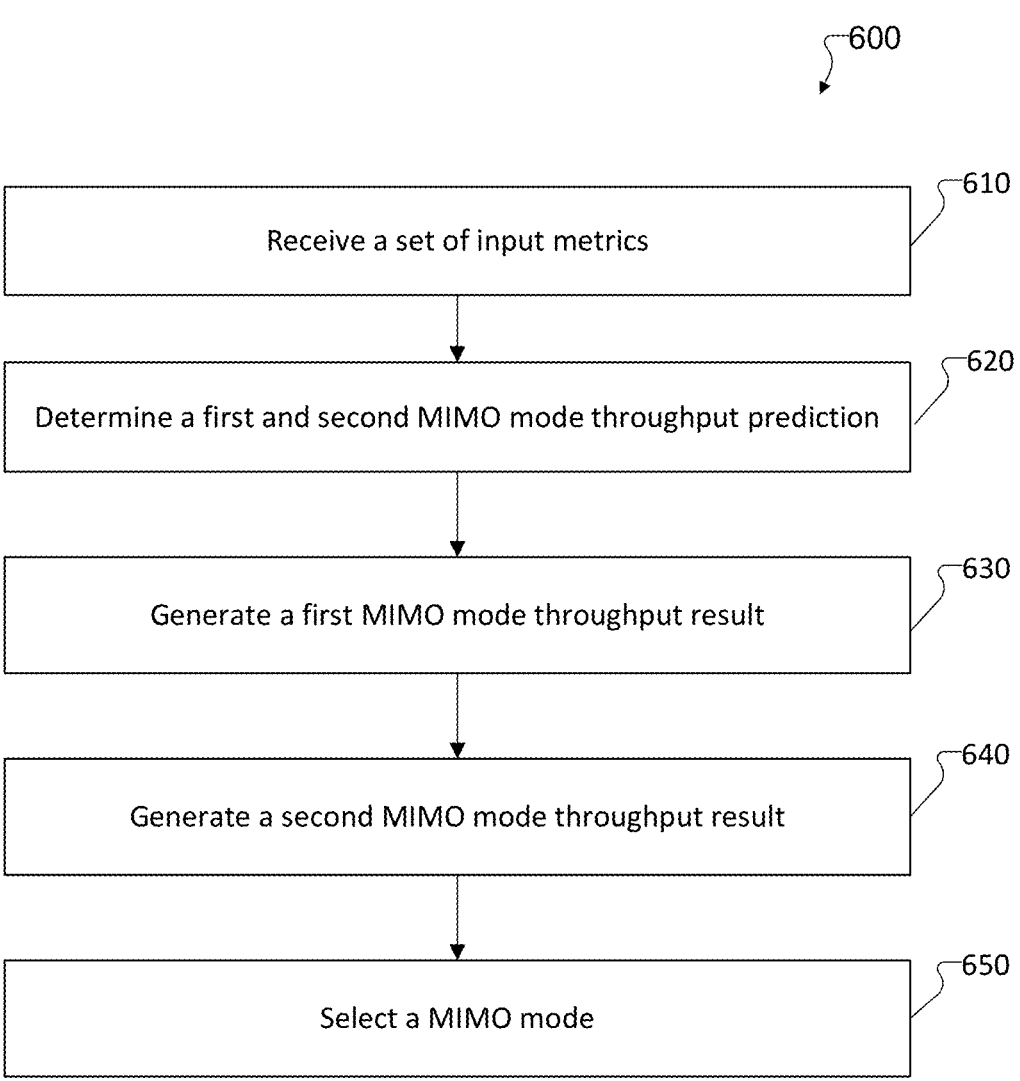
FIG. 6 illustrates an example method of transmission mode adaptation according to embodiments of the present disclosure.

FIG. 6 illustrates an example method 600 of transmission mode adaptation according to embodiments of the present disclosure. An embodiment of the method illustrated in FIG. 6 is for illustration only. One or more of the components illustrated in FIG. 6 may be implemented in specialized circuitry configured to perform the noted functions or one or more of the components may be implemented by one or more processors executing instructions to perform the noted functions. Other embodiments of throughput prediction could be used without departing from the scope of this disclosure.

As illustrated in FIG. 6, the method 600 begins at step 610. At step 610, a BS receives a set of input metrics. For example, the input metrics may be similar as described regarding FIG. 5. In one embodiment, the set of input metrics comprises at least one metric derived from a CSI report. At step 620, the BS determines a first MIMO mode throughput prediction and a second MIMO mode throughput prediction. The first and second MIMO mode throughput predictions may be determined based on the received set of input metrics. For example, the throughput prediction may be calculated similar as described regarding FIG. 5. At step 630, the BS generates a predicted first MIMO mode throughput result. The predicted first MIMO mode throughput result may be generated based on the first MIMO mode throughput prediction. For example, the first MIMO mode throughput result may be generated similar as described regarding FIG. 5. At step 640, the BS generates a predicted second MIMO mode throughput result. The predicted second MIMO mode throughput result may be generated based on the second MIMO mode throughput prediction. For example, the predicted second MIMO mode throughput result may be generated similar as described regarding FIG. 5. At step 650, the BS selects a MIMO mode. The selected MIMO mode may be based on the predicted first MIMO mode throughput result and the predicted second MIMO mode throughput result.

Although FIG. 6 illustrates one example of a method 600 transmission mode adaptation, various changes may be made to FIG. 6. For example, while shown as a series of steps, various steps in FIG. 6 could overlap, occur in parallel, occur in a different order, or occur any number of times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims. None of the description in this application should be read as implying that any particular element, step, or function is an essential element that must be included in the claim scope. The scope of patented subject matter is defined only by the claims.

What is claimed is:

1. A base station (BS) comprising:
   a transceiver configured to receive a set of input metrics, wherein the set of input metrics comprises at least one metric derived from a channel state information (CSI) report; and
   a processor operably coupled to the transceiver, the processor configured to:
      determine, based on the set of input metrics, a first multiple-input multiple-output (MIMO) mode throughput prediction and a second MIMO mode throughput prediction;
      generate, based on the first MIMO mode throughput prediction, a predicted first MIMO mode throughput result;
      generate, based on the second MIMO mode throughput prediction, a predicted second MIMO mode throughput result; and select a MIMO mode from among a precoding matrix indicator (PMI) mode and a transmit antenna selection (TAS) mode based on the predicted first MIMO mode throughput result and the predicted second MIMO mode throughput result.

2. The BS of claim 1, wherein, the MIMO mode is selected based on one of a deterministic selection procedure and a probabilistic selection procedure, the first MIMO mode is a precoding matrix indicator (PMI) mode, and the second MIMO mode is a transmit antenna selection (TAS) mode.

3. The BS of claim 1, wherein the set of input metrics further comprises at least one metric derived from a sounding reference signal (SRS).

4. The BS of claim 1, wherein the processor is further configured to:

select a first MIMO mode throughput prediction model based on a first MIMO mode throughput prediction error history and a first MIMO mode throughput prediction model selection history, wherein the first MIMO mode throughput prediction is determined based on the selected first MIMO mode throughput prediction model; and select a second MIMO mode throughput prediction model based on a second MIMO mode throughput prediction error history and a second MIMO mode throughput prediction model selection history, wherein the second MIMO mode throughput prediction is determined based on the selected second MIMO mode throughput prediction model, wherein the MIMO mode is selected based on the predicted first MIMO mode throughput result given the selected first MIMO mode throughput prediction model, the predicted second MIMO mode throughput result given the selected second MIMO mode throughput prediction model, and a corresponding model uncertainty.

5. The BS of claim 4, wherein the processor is further configured to update parameters related to the first and second MIMO mode throughput prediction models.

6. The BS of claim 4, wherein the first and second MIMO mode throughput prediction models are selected based on a condition of a communications channel.

7. The base station of claim 1, wherein the processor is further configured to:

determine, from a set of first MIMO mode throughput prediction models, a subset of first MIMO mode throughput prediction models based on a first MIMO mode throughput prediction error history and a first MIMO mode throughput prediction model selection history, wherein the first MIMO mode throughput prediction is determined based on a first combination result from the determined subset of first MIMO mode throughput prediction models; and determine, from a set of second MIMO mode throughput prediction models, a subset of second MIMO mode prediction models based on a second MIMO mode throughput prediction error history and a second MIMO mode throughput model selection history, wherein the second MIMO mode throughput prediction is determined based on a second combination result from the determined subset of second MIMO mode throughput prediction models, wherein the MIMO mode is selected based on the predicted first MIMO mode throughput result given the first combination result, the predicted second MIMO mode throughput result given the second combination result, and a corresponding model uncertainty.

8. A method of operating a base station (BS) comprising:

receiving a set of input metrics, wherein the set of input metrics comprises at least one metric derived from a channel state information (CSI) report;

determining, based on the set of input metrics, a first multiple-input multiple-output (MIMO) mode throughput prediction and a second MIMO mode throughput prediction;

generating, based on the first MIMO mode throughput prediction, a predicted first MIMO mode throughput result;

generating, based on the second MIMO mode throughput prediction, a predicted second MIMO mode throughput result; and selecting a MIMO mode from among a precoding matrix indicator (PMI) mode and a transmit antenna selection (TAS) mode based on the predicted first MIMO mode throughput result and the predicted second MIMO mode throughput result.

9. The method of claim 8, wherein, the MIMO mode is selected based on one of a deterministic selection procedure and a probabilistic selection procedure, the first MIMO mode is a precoding matrix indicator (PMI) mode, and the second MIMO mode is a transmit antenna selection (TAS) mode.

10. The method of claim 8, wherein the set of input metrics further comprises at least one metric derived from a sounding reference signal (SRS).

11. The method of claim 8, further comprising:

selecting a first MIMO mode throughput prediction model based on a first MIMO mode throughput prediction error history and a first MIMO mode throughput prediction model selection history, wherein the first MIMO mode throughput prediction is determined based on the selected first MIMO mode throughput prediction model; and selecting a second MIMO mode throughput prediction model based on a second MIMO mode throughput prediction error history and a second MIMO mode throughput prediction model selection history, wherein the second MIMO mode throughput prediction is determined based on the selected second MIMO mode throughput prediction model, wherein the MIMO mode is selected based on the predicted first MIMO mode throughput result given the selected first MIMO mode throughput prediction model, the predicted second MIMO mode throughput result given the selected second MIMO mode throughput prediction model, and a corresponding model uncertainty.

12. The method of claim 11, further comprising updating parameters related to the first and second MIMO mode throughput prediction models.

13. The method of claim 11, wherein the first and second MIMO mode throughput prediction models are selected based on a condition of a communications channel.

14. The method of claim 8, further comprising:

determining, from a set of first MIMO mode throughput prediction models, a subset of first MIMO mode throughput prediction models based on a first MIMO mode throughput prediction error history and a first MIMO mode throughput prediction model selection history, wherein the first MIMO mode throughput prediction is determined based on a first combination result from the determined subset of first MIMO mode throughput prediction models; and determining, from a set of second MIMO mode throughput prediction models, a subset of second MIMO mode prediction models based on a second MIMO mode throughput prediction error history and a second MIMO mode throughput model selection history, wherein the second MIMO mode throughput prediction is determined based on a second combination result from the determined subset of second MIMO mode throughput prediction models, wherein the MIMO mode is selected based on the predicted first MIMO mode throughput result given the first combination result, the predicted second MIMO mode throughput result given the second combination result, and a corresponding model uncertainty.

15. A non-transitory computer readable medium embodying a computer program, the computer program comprising program code that, when executed by a processor of a device, causes the device to:

receive a set of input metrics, wherein the set of input metrics comprises at least one metric derived from a channel state information (CSI) report;

determine, based on the set of input metrics, a first multiple-input multiple-output (MIMO) mode throughput prediction and a second MIMO mode throughput prediction;

generate, based on the first MIMO mode throughput prediction, a predicted first MIMO mode throughput result;

generate, based on the second MIMO mode throughput prediction, a predicted second MIMO mode throughput result; and select a MIMO mode from among a precoding matrix indicator (PMI) mode and a transmit antenna selection (TAS) mode based on the predicted first MIMO mode throughput result and the predicted second MIMO mode throughput result.

16. The non-transitory computer readable medium of claim 15, wherein:

the MIMO mode is selected based on one of a deterministic selection procedure and a probabilistic selection procedure, the first MIMO mode is a precoding matrix indicator (PMI) mode, and the second MIMO mode is a transmit antenna selection (TAS) mode.

17. The non-transitory computer readable medium of claim 15, wherein the set of input metrics further comprises at least one metric derived from a sounding reference signal (SRS).

18. The non-transitory computer readable medium of claim 15, wherein the computer program further comprises computer readable program code that, when executed by the processor, causes the device to:

select a first MIMO mode throughput prediction model based on a first MIMO mode throughput prediction error history and a first MIMO mode throughput prediction model selection history, wherein the first MIMO mode throughput prediction is determined based on the selected first MIMO mode throughput prediction model; and select a second MIMO mode throughput prediction model based on a second MIMO mode throughput prediction error history and a second MIMO mode throughput prediction model selection history, wherein the second MIMO mode throughput prediction is determined based on the selected second MIMO mode throughput prediction model, wherein the MIMO mode is selected based on the predicted first MIMO mode throughput result given the selected first MIMO mode throughput prediction model, the predicted second MIMO mode throughput result given the selected second MIMO mode throughput prediction model, and a corresponding model uncertainty.

19. The non-transitory computer readable medium of claim 18, wherein the first and second MIMO mode throughput prediction models are selected based on a condition of a communications channel, and the computer program further comprises computer readable program code that when executed by the processor causes the device to update parameters related to the first and second MIMO mode throughput prediction models.

20. The non-transitory computer readable medium of claim 15, wherein the computer program further comprises computer readable program code that when executed by the processor causes the device to:

determine, from a set of first MIMO mode throughput prediction models, a subset of first MIMO mode throughput prediction models based on a first MIMO mode throughput prediction error history and a first MIMO mode throughput prediction model selection history, wherein the first MIMO mode throughput prediction is determined based on a first combination result from the determined subset of first MIMO mode throughput prediction models; and determine, from a set of second MIMO mode throughput prediction models, a subset of second MIMO mode prediction models based on a second MIMO mode throughput prediction error history and a second MIMO mode throughput model selection history, wherein the second MIMO mode throughput prediction is determined based on a second combination result from the determined subset of second MIMO mode throughput prediction models, wherein the MIMO mode is selected based on the predicted first MIMO mode throughput result given the first combination result, the predicted second MIMO mode throughput result given the second combination result, and a corresponding model uncertainty.

* * * * *